United States Patent [19]

Kaye

[11] 4,113,389
[45] Sep. 12, 1978

[54] OPTICAL MEASUREMENT SYSTEM

[76] Inventor: Morton Kaye, 122 Third St., Stamford, Conn. 06905

[21] Appl. No.: 678,059

[22] Filed: Apr. 19, 1976

[51] Int. Cl.$^2$ .......................... G01B 9/04; G01B 11/00
[52] U.S. Cl. .................................. 356/164; 356/120; 356/167
[58] Field of Search ........ 356/120, 156, 160, 164–167, 356/199–200, 237; 250/222 R, 222 PC, 223 R, 223 B, 224, 560, 562, 572

[56] References Cited

U.S. PATENT DOCUMENTS

| 2,976,762 | 3/1961 | Imshaug | 356/156 |
| 3,022,578 | 2/1962 | Seibel | 356/156 |
| 3,187,185 | 6/1965 | Milnes | 250/222 R |
| 3,794,427 | 2/1974 | Shibata et al. | 356/120 |
| 3,976,382 | 8/1976 | Westby | 356/120 |

Primary Examiner—John K. Corbin
Assistant Examiner—Wm. H. Punter
Attorney, Agent, or Firm—Daniel M. Rosen

[57] ABSTRACT

A microscope-projector system is employed to image and view a transition of light and dark areas on an object. The position of the shadow corresponds to the vertical position of a portion of the object, and an adjustable device is employed for adjusting the position of the microscope-projector with respect to the object. A video camera may be connected to the microscope, to project the image on a monitor. Vertical adjustment of the microscope-projector assembly enables measurement of thickness, for example, with respect to a reference level. The scan lines of the video camera may also be employed to locate the position of the shadow to indicate the thickness of the object, and also to automatically readjust the position of the shadow to a reference level. Electronic circuitry may also play a part to determine from transition in scan lines the horizontal dimensions of an object.

9 Claims, 20 Drawing Figures

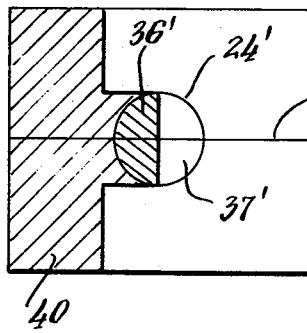
Fig. 4A. AT FOCAL PLANE
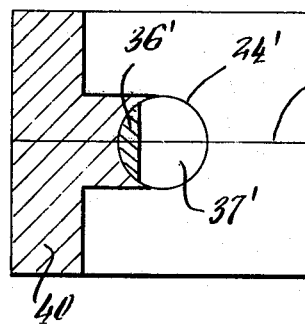
Fig. 4B. BELOW FOCAL PLANE
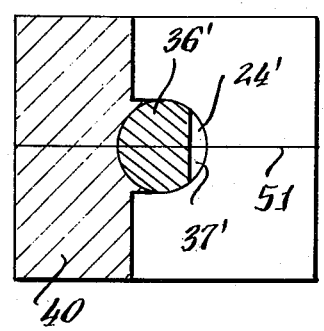
Fig. 4C. ABOVE FOCAL PLANE
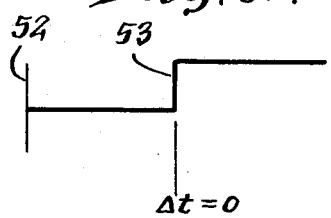
Fig. 8A.
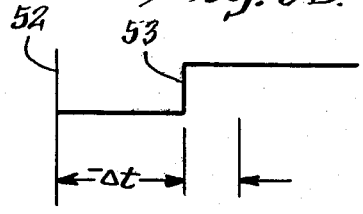
Fig. 8B.
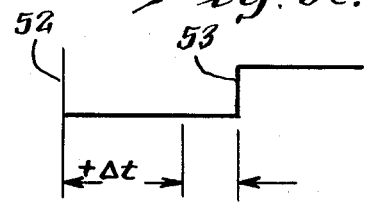
Fig. 8C.
CENTER SCAN AMPLITUDE
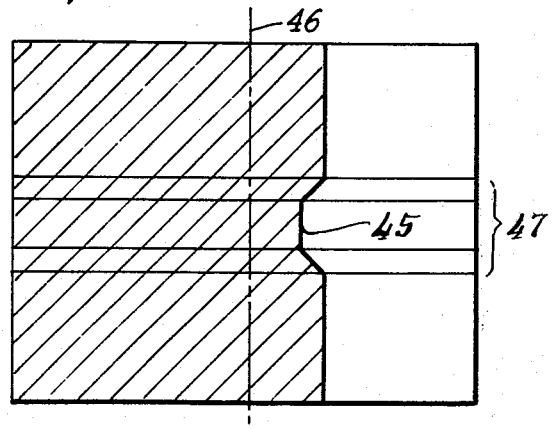
Fig. 5.
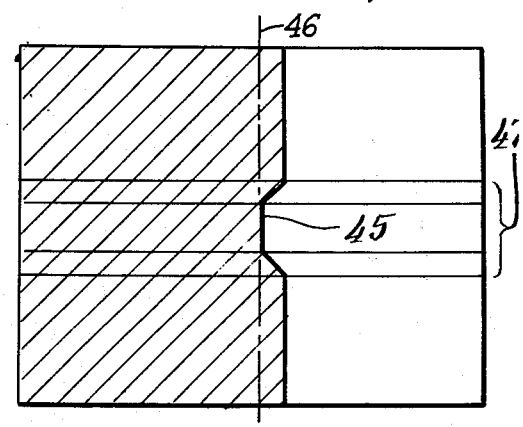
Fig. 6.
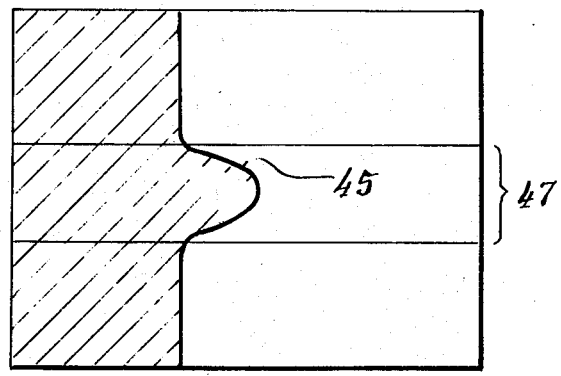
Fig. 7.

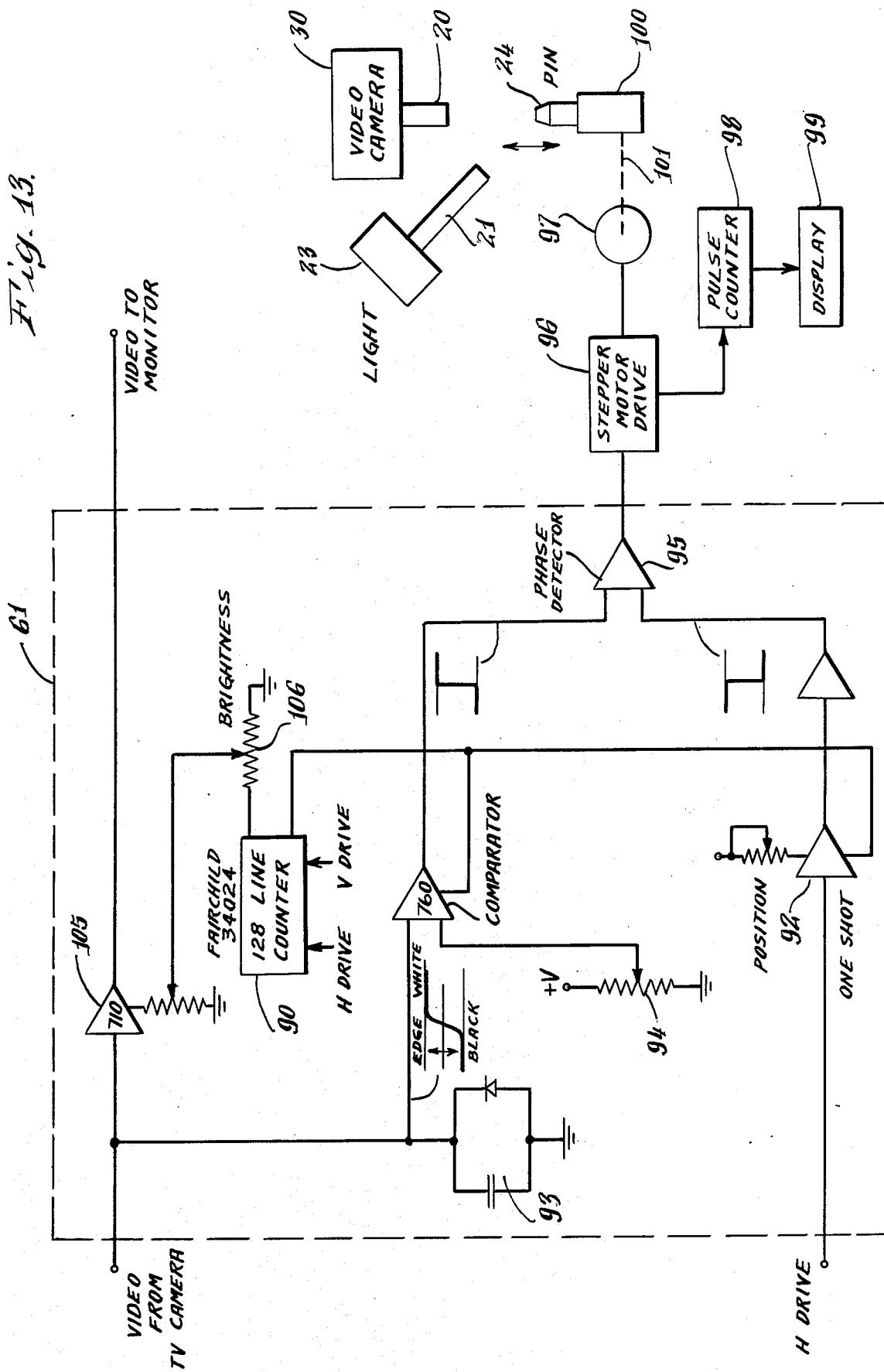

OPTICAL MEASUREMENT SYSTEM

THE INVENTION

This invention relates to optical measurement systems, and more in particular to a method and apparatus for optically determining thickness of objects at particular regions, as well as external dimensions of objects.

The invention is of particular interest in the determination of the thickness of metal below a score line, for example, in metal discs employed in the tops of cans. It is well known that cans are provided having score lines to permit the ready opening of areas defined by the score lines. It is, of course, essential that the depth of the scores, and more in particular, the thickness of material remaining below the scores be accurately controlled, so that the opening of the can may be readily effected, and so that adequate thickness of metal remains to ensure that the contents of the can are adequately retained.

In prior art measuring systems, for example, a Bausch and Lomb Scratch Depth Gauge, the image of a wire is projected on an object, and the image of the wire is viewed through a microscope. In viewing a scratch, the image of the wire in the region of the scratch is displaced, and this displacement may be ascertained by means of a reticle in the microscope. The displacement of the image of a wire thus corresponds to the depth of a scratch on the surface of an object.

This system, while having relatively good accuracy, provides only a subjective measurement since the operator views the image in the microscope directly. Thus, the operator, being subject to fatigue, cannot continually make accurate measurements. In addition, no means are provided in this system for measuring the thickness of material lying below the bottom of the scratch.

Briefly stated, in accordance with the invention, these disadvantages are overcome by providing a method and apparatus wherein a projector projects a shadow image of a knife edge, that is viewed by a microscope. The shadow image may be initially centered on a locator pin, and an object having a scratch is viewed by being placed on the pin. This results in displacement of the shadow image, whereby readjustment of the relative displacement between the microscope-projector assembly and the locator pin corresponds to the thickness of material between the bottom of the scratch or score and the bottom of the object.

In a preferred embodiment of the invention, a video camera is employed in combination with a microscope, so that the image may be presented on a monitor, in order to enable more accurate measurement of the position of the shadow.

In a still further embodiment of the invention, the scan lines of the video system are employed to detect time differences between the dark-light transitions, these time differences also being a measure of the vertical displacement of the microscope-projector assembly. A digital indication of the time differences of the transitions of the scan lines may be employed to provide a visual indication of the measurement to be determined, and the transitions of the scan lines may also be employed to automatically reposition the microscope-projector assembly to a reference position, by means of a servo system, so that all measurements may be effected automatically.

In a still further embodiment of the invention, the transitions of the scan lines may be employed to ascertain the diameter of an object, by determining the time difference between scan lines at the edges of the article.

In order that the invention may be more clearly understood, it will now be disclosed in greater detail with reference to the accompanying drawings, wherein:

FIGS. 4A-4C are top views corresponding to FIGS. 3a-3c respectively;

FIG. 6 is a view of the monitor of FIG. 1 showing a centered score;

FIG. 5 is a view of a monitor corresponding to FIG. 1, with the shadow displaced from the center of the monitor;

FIG. 7 is a view of a monitor corresponding to FIG. 5, with the score distorted due to use of a worn scoring tool;

FIGS. 8A-8C are time diagrams illustrating scan signals corresponding to FIGS. 4a-4c, respectively;

FIG. 13 is a block diagram of one embodiment of a control circuit in accordance with the invention.

Figure 1:
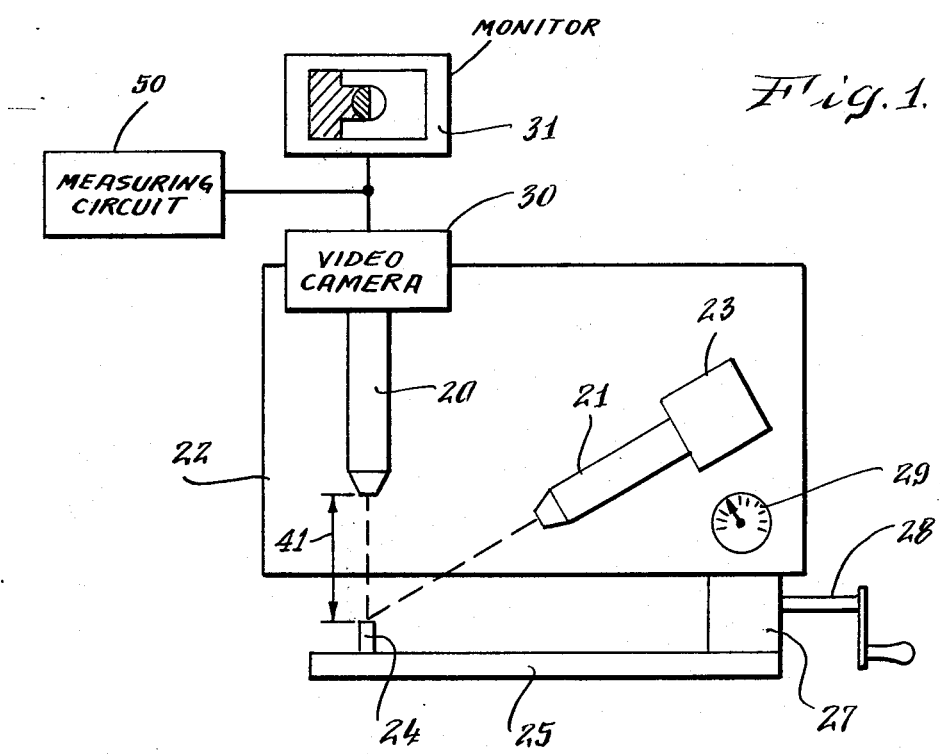
FIG. 1 is a simplified illustration of an apparatus in accordance with the invention.
Figure 2:
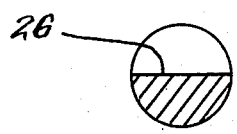
FIG. 2 is an illustration of the image of the top of the pin of FIG. 1.

Referring now to the drawings, and more in particular to FIG. 1, therein is illustrated, in simplified form, an apparatus in accordance with the invention. The apparatus is comprised of a microscope 20 and a projector 21 mounted on a suitable common frame 22, the projector 21 being positioned in direct light from a suitable source 23 at an angle of about 45° to the optical axis of the microscope. The projector 21 has a knife edge (not shown) therein, whereby the edge of the knife extends on a diameter of the projector, and the beam of light is focussed on a pin 24, mounted on a stage 25 as illustrated in FIG. 2. It is apparent that the light beam is thus semicircular, with the knife edge defining a straight transitional edge 26. The assembly, including the microscope 20 and the projector 21 is movably mounted with respect to the stage 25 by any convenient means, such as for example, an expandable support 27 which may be adjusted, for example, by means of a crank 28. A suitable gauge 29 is provided, for example, coupled to the crank 28 by conventional means, to provide a measure of the differences in vertical adjustment of the microscope and projector with respect to the stage 25. It will, of course, be understood that alternatively the stage may be moved with respect to the microscope and projector assembly, or the pin 24 may be separately moved with respect to the microscope and projector assembly. The microscope is directed to the upper end of the pin 24, whereby the shadow of the light beam appears at the end of the pin. It will be apparent from the following description that the projector should be oriented so that the transition 26 between the light and dark areas at the end of the pin extends cross-ways, that is, normal to the plane defined by the optical axis of the microscope and the axis of the light beam.

While the apparatus in accordance with FIG. 1 may be employed with the operator directly viewing the image through the microscope, it is preferred to mount a video camera 30 on the microscope, the video camera being connected to a monitor 31, whereby an enlarged image is presented. The mounting of the video camera may be in accordance with conventional practice.

Figure 3A:
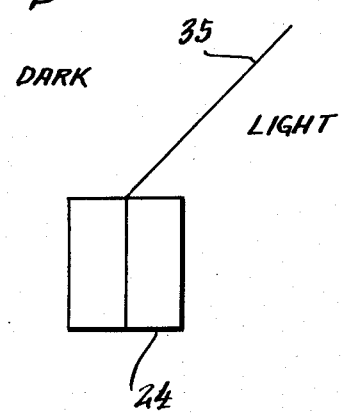
FIGS. 3A-3C illustrates three positions of the pin of FIG. 1.

FIG. 3A illustrates, in a simplified manner, a side view of the pin 24. The line 35 represents the transition between dark and light areas projected on the pin. In the position illustrated in FIG. 3A, the transition 35 extends to the center of the pin, whereby the left side 36 of the top of the pin is dark, and the right side thereof is light, the transition between these areas extending diagonally across the top of the pin. FIG. 4A shows the image on the monitor corresponding to the position of FIG. 3A. It is thus apparent that the transition between the viewed light area 37' and the viewed dark area 36' extends diametrically across the image 24' of the top of the pin 24. The shadow area 40, of course, also extends behind the pin and in a region of the stage displaced from the diametrical center of the pin.

Figure 3B:
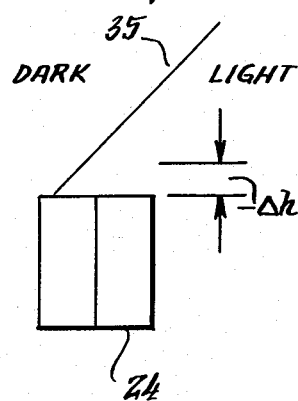
Figure 3C:
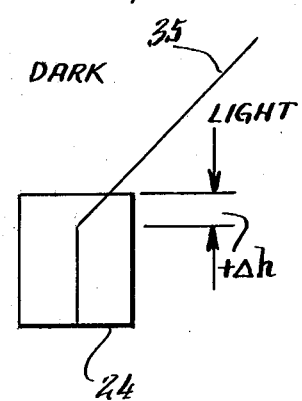

If the pin is moved downward, or the microscope-projector assembly is moved upwardly, by a distance Δ h, as illustrated in FIG. 3B, the transition between the dark and light areas extends across the left edge of the pin. The view on the monitor in this case is illustrated in FIG. 4B. Similarly, as illustrated in FIG. 3C, if the pin 24 is moved upwardly by a distance of Δ h, the transition between the dark and light areas extends across the right side of the top of the pin. The view on the monitor in this case is illustrated in FIG. 4C. It is thus apparent that the position of the transition between the light and dark areas on the top of the pin provides a measure of the distance between the pin and the microscope assembly.

It should, of course, be pointed out that the projector and microscope are in exact focal relationship with one another, so that the transition between the dark and light areas is sharp.

If a sufficiently high microscope power is employed, accurate measurements may be taken, that is, the position of the transition may be accurately determined, by optically viewing the image, employing a suitable reticle in the eye-piece of the microscope. In this case, however, the field of view would be small, as would be the depth of field and the working distance 41 between the microscope and the top of the pin. A narrow depth of field thus permits the edge of the shadow to be out of focus, so that it is difficult to define over the field. If the working distance is short, it may be impossible to properly direct the light beam so that it falls as desired in a groove. Similarly, it may be impossible to adjust the microscope to get near some scores in an object being viewed adjacent to changes in the level of the end of the viewed object, and it may be difficult to determine where the light spot is aimed. In all cases, this type of operation requires a subjective determination of the position of the shadow against the reticle.

When a video camera and monitor is employed, however, a microscope of low power, for example, a 10 power microscope may be employed, so that a 0.0001 inch distance in the object plane becomes 0.001 inch on the face of the Vidicon. Therefore, if the Vidicon has a resolution of 1000 TV lines per inch, the indirect per system resolution will be 0.0001 inch. A good microscope of 10 power may be provided with a working distance of nearly two inches, thereby permitting a good overall view of the object by the operator. If the area of the video camera measuring 0.5 × 0.66 inches is displayed on the monitor, then a line 0.010 inches wide in the object plane appears about one inch wide on a nine inch diagonal monitor.

As discussed above, the present invention is particularly directed to measuring the distance between the bottom of a score on a metal sheet and the bottom of the sheet. In other words, the invention is particularly directed to measuring the thickness of material remaining below the bottom of a score. In accordance with the invention, in order to make such a measurement, the microscope-projector assembly is first positioned, for example, by means of the crank 28, so that the transition between the light and dark areas, that is, the shadow, extends diametrically across the top of the pin. Then the object to be measured is placed on top of the pin, preferably with the lengthwise dimension of the score extending in the plane defined by the optical axis of the microscope and the axis of the projected light beam. The distance between the microscope-projector assembly and the pin is then adjusted so that the shadow at the bottom of the score returns to the center 46 of the image, whereby the distance of adjustment of the microscope-projector assembly with respect to the pin corresponds to the thickness of the material below the bottom of the score.

When a video camera-monitor assembly is employed, the resultant views on the monitor appear as illustrated in FIGS. 5 and 6. Thus, FIG. 5 shows the image when the object is first placed on the top of the pin. In this case, it is seen that the shadow has moved to the right, and the edge 45 of the shadow corresponding to the bottom of the score is to the right of the center line 46 on the monitor. When the relative vertical position of the microscope-projector assembly is adjusted as described above, the transition 45 coincides with the center 46 of the viewed image, whereby the adjustment corresponds to the thickness of the material below the score. It is of course apparent that, alternatively, the vertical position of the top of the pin may be adjusted, in accordance with the arrangement of FIG. 14.

It should be noted, as an incidental benefit, that the present invention may also enable determination of the wear on a scoring tool. Thus, FIGS. 5 and 6 illustrate the fact that the shape of the shadow in the region of the image 47 of the grooves provide a representation of the sharpness of the edges of the score, and hence the sharpness of the scoring tool. As illustrated in FIG. 7, however, when the scoring tool has been worn, a rounded image will be presented, so that the operator will be advised of the necessity of replacement of a scoring tool. It should, of course, be pointed out that the invention may also be employed to measure the depth of a score. In this case, for example, the microscope-projector assembly may be initially adjusted so that the shadow on the unscored portion of the object coincides with the center of the monitor screen, and, upon downward adjustment of the microscope-projector assembly, the shadow corresponding to the bottom of the score then is brought to the center of the monitor so that the vertical adjustment of the monitor corresponds to the depth of the score.

The arrangement in accordance with FIG. 1 is also adapted for electronic determination of the position of the shadow, so that it is not necessary to physically adjust the position of the microscope. For this purpose, a suitable electronic measuring circuit 50, to be described in greater detail in the following paragraph, may be connected to the output of the video camera. In this arrangement, measurements are made with respect to a scan line of the video camera extending through the center of the image. This line 51 is illustrated in FIG. 4A–4C. The amplitudes of the signals along the corresponding scan lines, from the edge 52 of the frame are respectively in FIGS. 8A–8C. Thus, referring to FIG. 8A, a transition 53 occurs in the signal level at a time which can be designated as a reference time, that is $\Delta t = 0$. In FIG. 8B, the transition 53 has moved to the left, whereby the distance between the reference 0 position and the transition 53 is $\Delta t$, this time being a measure of the displacement of the shadow. Similarly, referring to FIG. 8C, the transition 53 has moved to the right, indicating a positive time displacement from the reference position. Thus, by determining the time of occurrence of the transition 53, it is possible to provide an indication of the relative position of the microscope with respect to the object. The time movement of the transition 53 may be indicated digitally, for example, by providing a digital counter energized by clock pulses in the period from the left end of the scan line to the occurrence of the transition 53.

An increase in the order of magnitude of resolution by this technique may be made simply by slowing down the particular scan line, that is, the scan line extending through the center of the object, thereby decreasing the required system band width. With such a technique, systems may be provided having resolutions in the order of 20 microinches.

It should be pointed out that, since the measurements are referenced to the edge of the frame, normal drift may result in inaccuracies over a long period of time. In order to overcome this problem, suitable adjustments may be provided in the electronic cicuitry. For example, periodically a reference shadow may be viewed and centered on the monitor, with the circuitry then being adjusted so that the position of the reference shadow corresponds to the reference times zero.

It must, of course, be pointed out that thickness of the material below any portion of the score, for example, displaced from the bottom, may also be measured by the above technique. Thus, when measurements are being made electronically, the scan line that is measured may be a scan line displaced from the center of the object, to extend to any desired portion of the score. If desired, the scan line along which the measurement is taken may be suitably indicated on the monitor.

Figure 9:
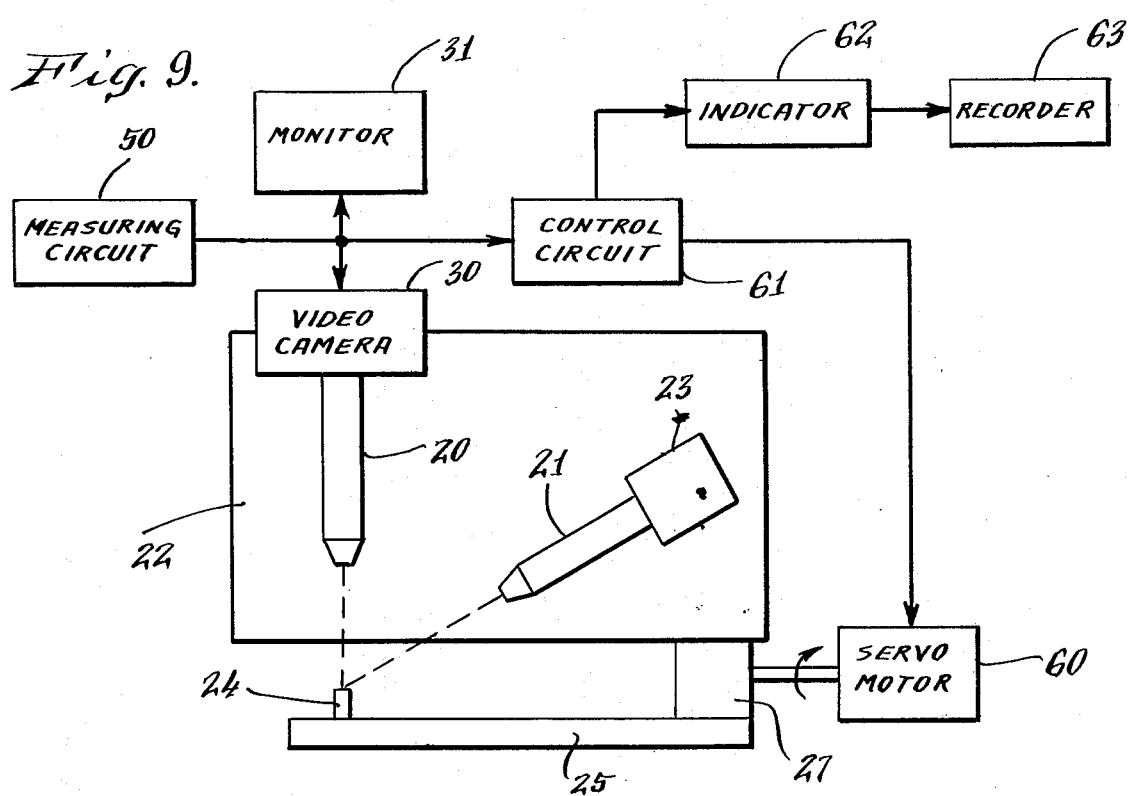
FIG. 9 is a simplified illustration of a modification of an apparatus in accordance with the invention.

Since the detector of the shadow position is a scan line from the video camera, the output of the video camera is an electric signal which has a magnitude and direction such that it may be employed automatically to position and reposition the microscope-projector assembly. Thus, as illustrated in FIG. 9, a suitable Servo motor 60 is provided to adjust the positioning device 27. A control circuit 61, to be described in greater detail in the following paragraph, receives the signal from the output of the video camera for producing a control signal for the Servo motor 60. In this case, upon initiation of operation of the control circuit, the Servo motor is controlled to automatically adjust the relative position of the microscope-projector assembly so that the shadow along the measured scan line returns to the reference zero position. If desired, a suitable indicator 62 may be provided for keeping track of the displacement of the signal from the zero reference level. The zero reference level, in the above arrangements, conveniently corresponds to the top of the pin 24. Thus, in the arrangement in accordance with the invention, all adjustments of the system may be automatic, so that it merely requires an operator for placing the object on the pin, and for initiating the operation of the automatic circuitry.

The display of the measurement results may thus either be on the monitor or on a separate digital dislay device. A recording system having a cartridge disc may be employed to record all measurement results, for example, the recorder 63 illustrated in FIG. 9. The recording system may thus record a data and a time, the type of the object measured, as well as an indication of the particular measuring apparatus employed and any further required information. All data may thus be retrievable on a printout, for either straight output or to be statistically analyzed, in a manner identical to that employed in compound weighting systems. The system may also include means for recording a tool condition code, so that tooling changes may be anticipated. If the recording system is employed, then an off-line mode switch may permit operators to employ the system for setup or occasional checks.

Figure 10:
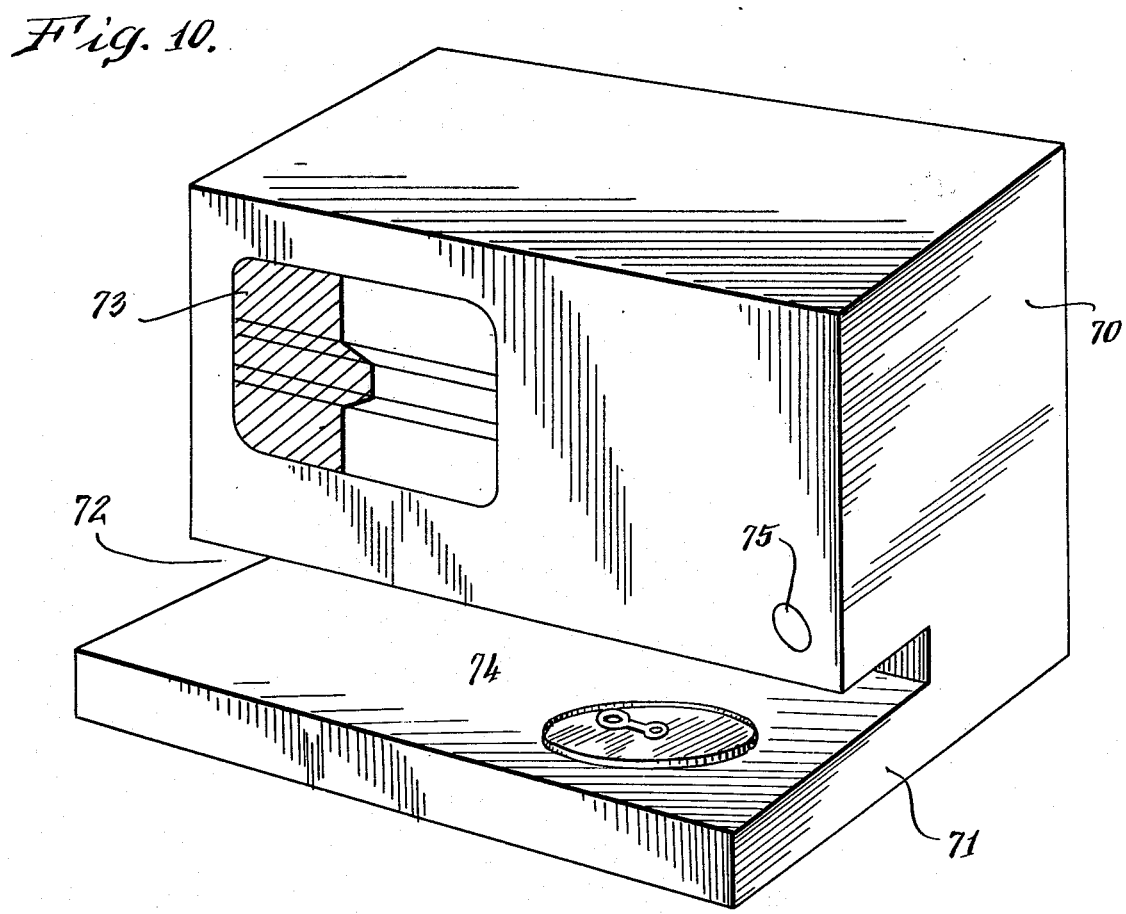
FIG. 10 is a perspective view of the preferred embodiments of an apparatus in accordance with the invention.

A particularly practical, physical embodiment of the invention is illustrated in FIG. 10. In this arrangement, a housing 70 has a lower outwardly extending platform 71, the upper portion of the housing 70 extending over the platform 71 to define a throat 72. The monitor 73 may be provided at the top of the housing over the throat. Internally, above the throat, the housing contains the microscope-projector assembly, as well as the Servo adjustment therefor, and the video camera, and all of the above-described electronic circuitry. In the operation of this system, it is thereby merely necessary for an operator to place an object 74 to be measured on the platform, and initiate the operation of the system, for example, by a start button 75 on the housing or a suitable foot switch. Zero alignment is a maintenance adjustment, and need not be performed during operation. The throat of the platform should be designed, for example, to permit examining the center of the largest object to be measured.

Figure 11:
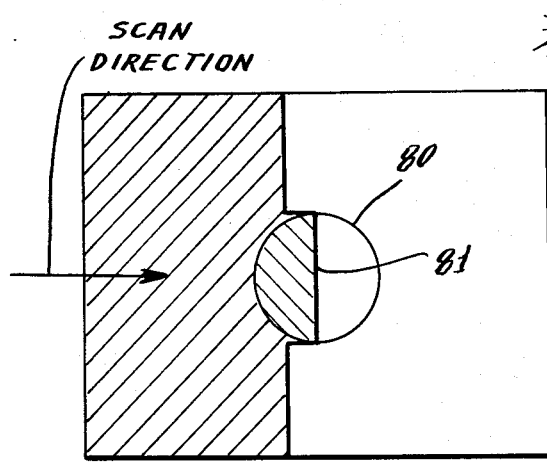
FIG. 11 is a view of the monitor of FIG. 1 in the measurement of the diameter of a rivet.
Figure 12:
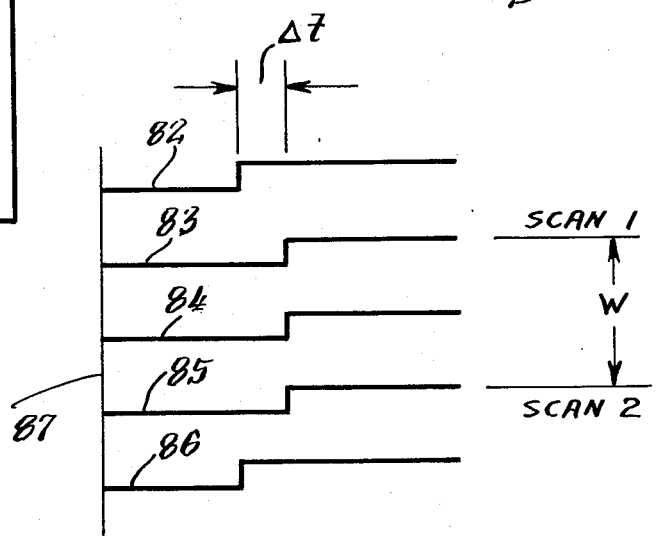
FIG. 12 is a time diagram illustrating several scan line signals of the monitor image of FIG. 11.

In a further particularly advantageous embodiment of the invention, the apparatus in accordance with the invention may also be employed to determine the diameter of an object, for example, the diameter of a rivet employed in a can top. In this arrangement, the rivet is positioned at the locator pin, so that an image appears on the monitor as is illustrated in FIG. 11. In this figure, the circle 80 corresponds to the outer circumference of the rivet, the shadow appearing similarly to that in FIG. 4A. In other words, the assembly is adjusted so that transition 81 between light and dark areas extends diametrically across the image of the top of the rivet. FIG. 12 illustrates the signals of various scan lines of the video camera. Thus, scan line 82 corresponds to a scan line above the rivet. Scan line 83 corresponds to the first scan line across the top of the rivet. Scan line 84 corresponds to a scan at the center of the rivet, and scan line 85 corresponds to the scan at the lower-most perimeter of the rivet. Scan line 86 corresponds to a scan line below the rivet. It is apparent that the position of the transition of the signals of scan lines 83–85 are separated by a certain number of scan lines from the transitions of the scan lines 82 and 86, with respect to the reference edge 87 corresponding to the left edge of the frame. Suitable electronic circuitry, to be described in greater detail in the following paragraphs, is then employed to determine the number of scan lines between the scan lines 82 and 86, this number corresponding to the width W of the top of the rivet, that is, the diameter of the rivet.

In taking the measurements of the type illustrated in FIGS. 11 and 12, the system may require a different magnification range than that employed in the measurement of thickness of material below a score. The microscope thus may be provided with a turret objective, which may be rotated depending upon the type of measurement to be taken. The locator pin 24 may also be replaceable, so that, for example, a locator pin may be employed having a form of the correct size to fit the concave inside of a rivet to be measured, so that the rivet may be centered in the field of view. Thus, in accordance with the invention, a turret may also be provided having a plurality of locator pins 24 thereon, so that the correct locator pin may be employed, depending upon the form of the object and the type of measurement to be taken.

Referring now to FIG. 13, the control circuit 61 comprises means for identifying the center line of the frame of the video signals from the television camera. For this purpose, if the video signal from the television camera is a conventional 512 line interlaced image, a 128 line counter 90 is stepped by the horizontal drive signals of the television image, and reset by the vertical drive signals of the television signal. The horizontal and vertical drive signals may, of course, be obtained from the television camera. The vertical drive signals insert a bit in the first stage of the counter, so that, on the 128$^{th}$ line of the image, an output signal appears on the 128$^{th}$ line, that is, the center line of the image. It is, of course, apparent that a counter of different length must be employed to select the center line if the image from a television camera has a different number of lines.

The output signal from the counter 90 is connected, as an enable signal, to a comparator 91 and to a one-shot multivibrator 92.

The D.C. level of the video signal is restored by a D.C. restorer 93, and connected to one input of the comparator 91. The other input of the comparator, which may be a type 760, is connected to the center arm of a potentiometer 94. The ends of the potentiometer are connected between ground reference and a positive source of D.C. voltage, and the potentiometer is set to apply a voltage to the comparator 91 corresponding to an intermediate level between the black and white levels of the video signal. As a consequence, a sharp transition occurs at the output of the comparator 91 as the video signal passes the black-white edge.

The horizontal drive signal from the television camera is also applied to the one-shot multivibrator 92, and the multivibrator is adjusted, by conventional means, to produce a transition in its output signal at the center of the scan lines. That is, the one-shot multivibrator produces a pulse of a duration equal to one-half a scan line in response to the horizontal drive signal.

The outputs of the comparator 91 and one-shot multivibrator are applied as separate inputs to a phase detector 95. The output of the phase detector is thus responsive to the sequence in which the two inflected input signals are received, whereby the output is one polarity if the inflection of the output signal of the comparator 91 is first, and is of the opposite polarity if the inflection of the output signal of the one-shot multivibrator is first.

The output of the phase detector 95, in the control circuit 61, may be applied to a stepper motor drive circuit 96 for controlling a stepper motor 97 connected to control the distance between the microscope objective and the object. The drive of the stepper motor drive circuit 96 is in such a direction as to always try to make a phase difference equal to zero, between the inflections of the signals applied to the phase detector 95. The mechanical coupling to the motor is set so that each output signal from the motor drive circuit 96 corresponds to a predetermined distance of movement between the object and the microscope objective, such as 1/10,000 inch.

Figure 14:
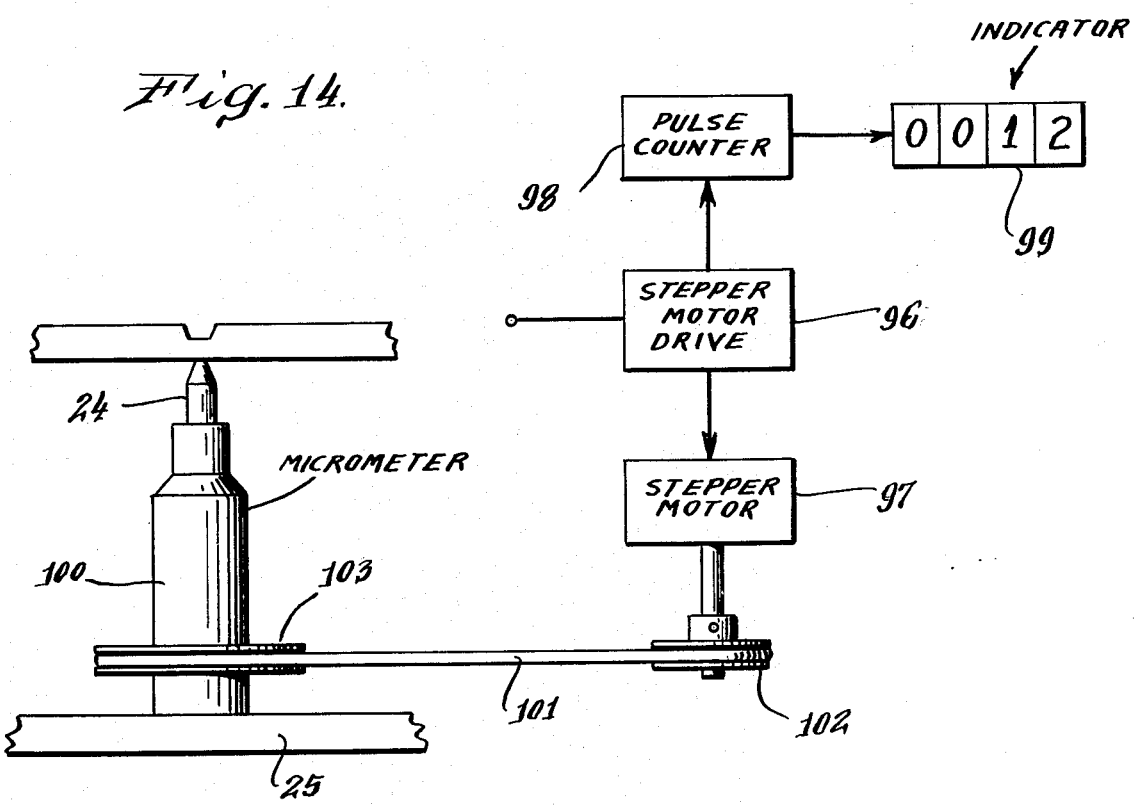
FIG. 14 is a simplified illustration of a modification of the apparatus in accordance with the invention particularly adaptable for use with the system of FIG. 13, wherein the vertical position of the pin is adjusted.

A pulse counter 98, such as an up-down counter, is also connected to the output of the stepper motor drive 96, and a digital display device 99 is energized by the pulse counter 98. As a consequence, if the pulse counter is set to zero at a reference distance, the display 99 will indicate the distance between the microscope objective and the object over or under the reference distance. In a particularly advantageous distance control arrangement, for controlling the distance between the locator pin 24 and the microscope objective 20, employing the control circuit of FIG. 13, the locator pin 24 is mounted on the stage 25 by means of a micrometer 100, as illustrated in FIG. 14. A toothed belt 101 is provided extending between a pulley 102 on the shaft of the stepper motor 97, and a pulley 103 on the micrometer 100. In this arrangement, the level of the top of the pin 24 is thereby adjusted by the stepper motor 97 a distance indicating visually by the indicator 99, and the projector 21 and microscope 20 are held in a fixed position.

In the arrangement of the invention illustrated in FIG. 9, the output of the video camera is shown as being applied directly to the monitor. In the particularly advantageous arrangement in accordance with the invention, however, as illustrated in FIG. 13, the output of the television camera is applied to the monitor by way of an adder 105. An output of the counter 90 is also applied to the adder 105, whereby the center line of the image is brightened so the operator can see which line is employed in the measurement. In order to adjust the brightness of the indicator line, the output of the counter 90 may be applied to the adder 105 by way of a brightness potentiometer 106.

While the invention has been disclosed and described with reference to a limited number of embodiments, it will be apparent that many variations and modifications may be made therein, and it is intended in the following claims to cover each such variation and modification as follows within the true spirit and scope of the claims.

What is claimed is:

1. An apparatus for measuring a dimension of an object, comprising stage means for receiving siad object, a microscope viewing assembly positioned to view an object on the stage means on a first optical axis, projection means mounted to focus a knife edge image on said object on said stage means along a second optical axis, the light-dark transition of said image extending normal to the plane defined by said first and second optical axes, means relatively displacing said microscope viewing assembly along said first optical axis with respect to said stage means, measuring means for indicating displacement of said microscope assembly on said first optical axis, and means mounting said projection system for movement with said microscope assembly.

2. The apparatus of claim 1 wherein said first and second optical axes are at an angle of 45° to one another.

3. The apparatus of claim 1 further comprising means coupled to said microscope viewing assembly to produce signals occurring at times corresponding to the light-dark transitions of said image, and means responsive to said signals for relatively displacing said stage means along said first optical axis with respect to said microscope and projection systems, for displacing said light-dark transition on said object to a determined position.

4. A method for measuring a dimension of an article comprising focusing an image of a knife edge on the surface of the article along an optical axis at an angle to said surface, whereby the light-dark transition of the image on the surface, if the surface were a plane surface, would extend normal to the projection of the optical axis on the surface, determining the displacement of the light-dark transition on the surface with respect to a reference position, and moving said article in a direction normal to said surface to obtain a given value for said displacement, whereby the extent of said movement is a measure of said dimension.

5. The method of claim 4 wherein said step of determining the displacement comprises scanning the image along a given line to produce a signal at the light-dark transition, whereby the time of occurrence of said signal with respect to a given time is a measure of said displacement.

6. A method for measuring the thickness of an article beneath a groove in the article, comprising focusing an image of a knife edge on a surface from a position at an acute angle to the surface, with the light-dark transition of the image extending normal to the projection of the optical path from said position to said image on said surface, said light-dark transition lying in a given plane normal to said surface, placing said article on said surface with said groove normal to said plane, and relatively displacing said surface with respect to said position in a direction substantially normal to said surface until the light-dark transition at the bottom of the groove lies in said plane, whereby said relative displacement is a measure of said thickness.

7. A method for measuring a dimension of an object with a microscope device having a first optical axis intersecting said object, comprising focusing an image of a knife edge on said surface along a second optical axis at an acute angle to said first optical axis, with the light-dark transition of said image extending normal to the plane of said first and second optical axes, and relatively displacing said object with respect to said microscope device in the direction of said first optical axis while retaining the relative positions of said first and second optical axes until a given point on the light-dark transition of said image moves to a reference position.

8. A system for determining a dimension of an object comprising means focusing an image having a light-dark transition on said object, means for optically scanning said image to produce a video signal, whereby an inflection occurs in a given line of said video signal at a time corresponding to said transition, means for adjusting the position of said object until said inflection occurs at a reference potential in said given line, and means for indicating the amount of said adjustment to determine said dimension, said means for optically scanning comprising a television camera, and said means for adjusting comprising micrometer means positioned to move said object along the optical axis of said television camera.

9. The system of claim 8 further comprising a source of a reference signal occurring at a determined time after the beginning of said given line, means comparing the phase of said reference signal with said inflection of said video signal to produce a control signal, and means responsive to said control signal for adjusting said micrometer means in a direction to reduce the time difference between said inflection and said reference signal.

* * * * *